United States Patent [19]

Broetto

[11] 4,255,628

[45] Mar. 10, 1981

[54] INSUFFICIENT PRESSURE DETECTOR DEVICE FOR MOTOR VEHICLE TIRES

[75] Inventor: Costantino Broetto, Milan, Italy

[73] Assignee: Fratelli Borletti S.p.A., Milan, Italy

[21] Appl. No.: 934,761

[22] Filed: Aug. 17, 1978

[30] Foreign Application Priority Data

Sep. 27, 1977 [IT] Italy ................................ 53514 B/77

[51] Int. Cl.³ .......................................... H01H 35/24
[52] U.S. Cl. .................................................. 200/61.25
[58] Field of Search ................. 200/61.22, 61.25, 83 B, 200/83 N, 83 J

[56] References Cited

U.S. PATENT DOCUMENTS

| | | | |
|---|---|---|---|
| 3,109,908 | 11/1963 | Clason | 200/83 J |
| 3,185,960 | 5/1965 | Howard | 200/61.22 |
| 3,873,787 | 3/1975 | Nozi | 200/61.25 |
| 3,963,887 | 6/1976 | Takusagawa et al. | 200/61.25 X |
| 3,985,984 | 10/1976 | Cappa | 200/61.22 |

FOREIGN PATENT DOCUMENTS

| | | |
|---|---|---|
| 986131 | 3/1965 | United Kingdom. |
| 2005476 | 4/1979 | United Kingdom .................. 200/61.25 |

*Primary Examiner*—James R. Scott
*Attorney, Agent, or Firm*—Ladas & Parry

[57] ABSTRACT

An insufficient inflation pressure detecting device for motor vehicle tires, of the type formed by a body which is arranged to be fixed on a tire supporting rim and contains in its interior an element movable proportionally to the pressure. The main feature of this device is to allow an hermetic assembly of the element with respect to a peripheral surface of the body, turned towards the tire.

5 Claims, 4 Drawing Figures

INSUFFICIENT PRESSURE DETECTOR DEVICE FOR MOTOR VEHICLE TIRES

BACKGROUND OF THE INVENTION

The present invention relates to an insufficient pressure detecting device for motor vehicle tires.

It is known that the tires for motor vehicle wheels require pre-established inflation pressures which vary according to the type and dimensions of the tire, the weight acting on the tire and the prevailing use of the motor vehicle. The said inflation pressure must be within well defined limits; in particular, when the said pressure drops below a lower limit, a deformation of the tire takes place with a consequent development of heat by friction. Thus, an increase of the temperature of the tire is produced, which increase can reach such high values as to produce irreversible alterations of the rubber mix and a progressive damage of the tire itself.

Moreover, since also the temperature of the air inside the tire increases, a corresponding increase of the inflation pressure takes place; therefore, the limit of insufficient pressure should be referred to a precise value of the temperature, and thus an insufficient pressure detector device should have a point of intervention as a function of the temperature itself.

Known detector devices are mounted inside the metal rim of the wheel and are substantially formed by a closed tight cavity filled with air, or another gas, at a pressure near the one which has to be signalled; a wall of the said cavity is formed by a resilient diaphragm one outer face of which is in contact with the air under pressure contained within the tire. Thus, this diaphragm is subjected, on one hand, to the pressure within the tire and, on the other hand, to the pressure within the tight cavity; this cavity is separated from the air contained within the tire by means of walls made of a material which is a good heat conductor, so that the gas contained within the cavity is substantially at the same temperature as the tire.

Connected to the diaphragm, which preferably is made of metal, is a system of electric contacts which are actuated by the diaphragm. Depending on the inflation pressure of the tire being respectively higher or lower than a pre-established lower limit value previously calibrated by means of more or less gas being introduced into the said tight cavity, the said electric contacts assume a first or a second reciprocal position and enable, in a corresponding electric circuit, signaling means which signal any eventual decrease of the pressure below the pre-established limit value.

The compensation of the inflation pressure increase produced only by the heating takes place inasmuch as also the gas contained in the said cavity is heated, which gas also undergoes a pressure increase so that on the opposed surfaces of the said resilient diaphragm two pressure variations are generated which are equal to one another and opposite in sign.

The devices of the type described, although operating in a satisfactory way, have some disadvantages.

Firstly, they are suitable for being mounted in a simple way only on wheel rims with tubless tires, i.e. with the sensible diaphragm facing directly into the space in which it is desired to detect the pressure, whilst in the case of tires with an air tube the said devices require the tube to be of a special configuration or to be provided with particular means for causing the air contained in it to lap the said sensible diaphragm. Secondly, the said devices require the said tight cavity to be filled during the manufacture with air, or another gas, having a pressure higher than the atmospheric pressure. This involves both a constructional complication and a certain risk that in the long time, owing to even the smallest manufacturing imperfections, the cavity might loose the gas through microslots, porosity or by diffusion through the walls, thereby giving rise to a lowering of the minimum limit of calibration and a consequent delay of the indication of insufficient inflation pressure.

SUMMARY OF THE INVENTION

The object of the present invention is to provide an insufficient pressure detecting device for motor vehicle tires, which device, besides having all the advantages of the known devices, will be substantially free from the described disadvantages of the said known devices.

According to the present invention there is provided an insufficient inflation pressure detecting device for motor vehicle tires, of the type formed by a body which is arranged to be fixed on a tire supporting rim and contains in its interior an element movable proportionally to the said pressure, wherein there are comprised first means for allowing an hermetic assembly of the said element with respect to a peripheral surface of the said body, turned towards the said tire.

BRIEF DESCRIPTION OF THE DRAWINGS

For a better understanding of the present invention a preferred embodiment will now be described with reference to the accompanying drawings in which.

DETAILED DESCRIPTION OF THE INVENTION

Figure 1:
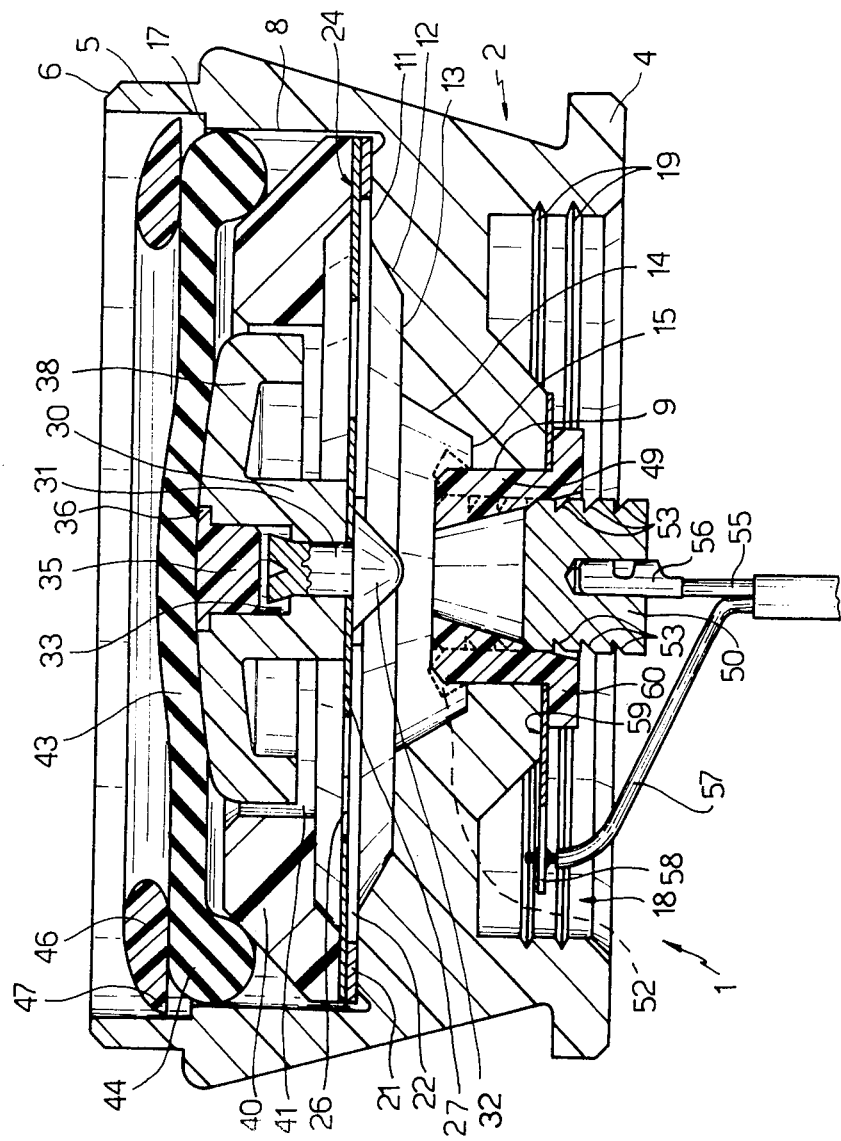
FIG. 1 is a longitudinal sectional view of a detector device constructed in accordance with the teachings of the present invention.

Referring particularly to FIG. 1 reference numeral 1 generally indicates a detector device comprising a support body 2 which laterally and externally presents a circular cross-section progressively increasing from a first end, from which extends radially towards the exterior an annular flange 4, to a second end from which extends axially towards the exterior an annular extension 5 having a chamfered outer edge 6. Body 2, conveniently made of a metal, and preferably of aluminium, is provided in its interior with two cylindrical coaxial seatings of different diameters and indicated respectively by reference numeral 8 the one which has the larger diameter and is dipsosed near the annular extension 5 and by reference numeral 9 the one which has the smaller diameter and is disposed in the region of the flange 4. The said seatings 8 and 9 are connected to one another by an alternating sequence of annular perpendicular plane portions and annular bands with concavities turned towards the seating 8 which, beginning from the seating 8, are indicated respectively in the order by reference numerals 11, 12, 13, 14 and 15. Furthermore, a side surface of the seating 8 is connected to a corresponding inner surface of the annular extension 5 by means of a plane perpendicular annular portion 17, whilst seating 9, on the side opposed to seating 8, communicates with an annular chamber 18 a side surface of which is formed with a plurality of annular grooves 19.

Figure 2:
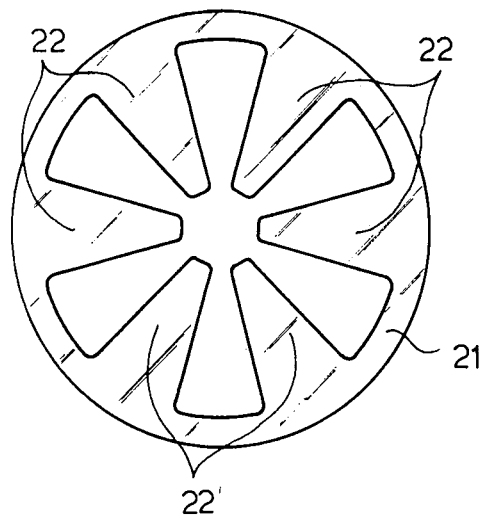
FIG. 2 is a reduced top and sectional view of a first detail of the device shown in FIG. 1.

Supported by annular portion 11 is a first annular element 21 (FIG. 2) provided with a plurality of radial projections 22 turned inwardly. In particular, element 21 is made of two metal materials having a different coefficient of thermal expansion, so that a variation of temperature causes in the projections 22 a flexion directed axially towards the portion opposed to seating 9 and having an amplitude proportional to the said temperature variation.

Figure 3:
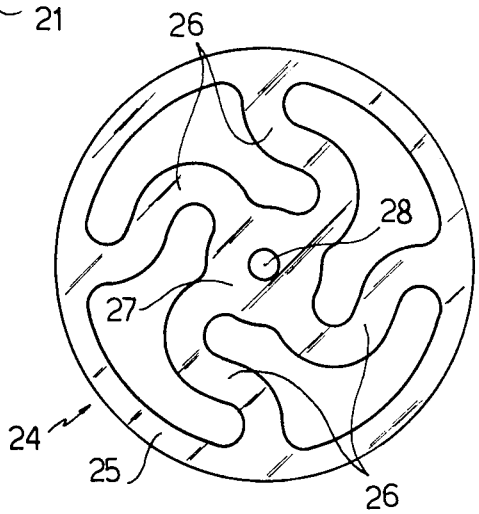
FIG. 3 is a reduced top and sectional view of a second detail of the device shown in FIG. 1.

Disposed on element 21 is a second annular element 24 (FIG. 3) having the same diameter as element 21 and provided with an outer annular portion 25 connected by means of a plurality of curved portions 26 to an inner annular portion 27 formed with an axial bore 28. Element 24 has a specific function of centering a cap 30 to which it is rigidly connected by means of an electric contact element 31. In particular, element 24 results in being disposed between a base surface of a substantially conical head 32 of the electric contact element 31 and a base surface of cap 30, and is rigidly connected to the latter by riveting one end of element 31, opposed to the conical head 32, inside a corresponding seating 33 of cap 30.

Seating 33 is closed by means of a plug 35 which is conveniently made of a plastic material and has a radial rim 36 which allows to correctly position the plug within the said seating, and, finally, cap 30 has a circular head 38 with the concavity turned towards its own base surface mentioned above.

Resting on portion 25 of element 24 is an annular element 40 which has a structure substantially defined by the combination of two coaxial frusto-conical surfaces and is provided with an axial through hole 41 within which the cap 30 is movable axially against the resilient action of the elements 21 and 24.

Disposed on the surface of the circular head 38 of the cap 30 is a central portion of a resilient circular diaphragm 43, conveniently made of an elastomeric material, which extends peripherally into a toroidal ring 44. This ring cooperates, on the one hand, with an annular portion of a side surface of the cylindrical seating 8 and, on the other hand, with an annular portion of an outer side surface of annular element 40.

On the toroidal ring 44 there is disposed a washer 46 having a substantially elliptical cross-section and an edge 47 in a position corresponding to the contact region between annular portion 17 and the inner surface of the annular extension 5.

Housed inside the seating 9 of the body 2 is a sleeve 49 made of an insulating material, preferably Teflon, arranged to receive in its interior a cylindrical electric contact element 50. In particular, sleeve 49 has an inner surface tapered towards the inside of body 2; accordingly, a forced insertion of the element 50 causes the tapered portion of the said sleeve 49 to expand towards the outside and against the said cylindrical seating 9, thereby producing at one end a bead 52 which engages with the annular portion 15 of the body 2. Moreover, the sleeve 49, at the inner side of its tapered surface, deforms radially to engage a plurality of indentations 53 formed radially towards the interior of the cylindrical electric contact element 50. Connected to the element 50 by means of a corresponding connector 56 is an electric cable 55, and moreover an electric cable 57 is connected to body 2 by means of a plate 58 maintained in contact with a lower surface 59 of body 2 by a flanged wall 60 of the sleeve 49.

Figure 4:
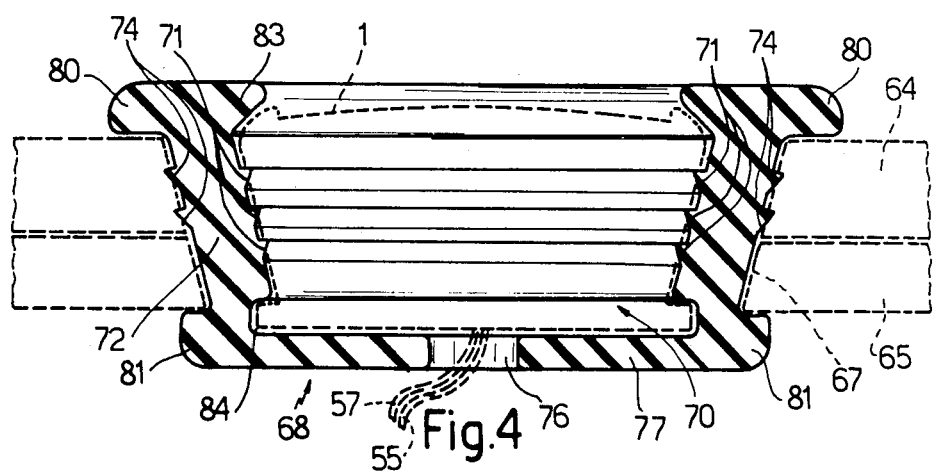
FIG. 4 is a longitudinal sectional view of a portion of a wheel rim comprising the device of FIG. 1 mounted on the rim by means of a container element also made in accordance with the teachings of the present invention.

Referring in particular to FIG. 4 there is shown a portion 64 of a rim a motor vehicle wheel, which portion is disposed on a wall 65 supporting the said rim and connecting it to a hub (not shown) of the wheel.

Inside a conical through hole 67 formed radially on the rim 64 and the wall 65 there is housed the device 1 by means of a connection element 68 made of an elastomeric material. The said element 68 has a substantially frusto-conical outer structure and is provided internally with a seating 70 arranged to receive the device 1. Inside the seating 70 the said device is mounted in a slightly forced fashion against annular projections 71 extending from a side wall 72 of element 68 radially towards the inside of the seating 70. Annular projections 74, analogous to projections 71, are present on the outer surface of the wall 72 near a contact region of the said wall with the rim 64, and, moreover, a through hole 76 on a base wall 77 of element 68 allows the passage of connection cables 55 and 57 of the device 1. Moreover, wall 72 extends, at its own ends, into two annular radial rims 80 and 81 which engage corresponding surfaces, turned towards them, of the rim 64 and the wall 65 respectively, so as to produce a positive engagement of the element 68 with respect to the said wheel rim. An analogous inner radial annular rim 83 and an annular groove 84 are provided inside the seating 70 in order to allow a positive engagement of the device 1 inside the connection element 68.

During the assembly of the device 1, the annular extension 5 of body 2 is turned over internally on the washer 46 so as to bring the edge 47 of the said washer against the annular portion 17 of body 2. In these conditions there is a shrinkage of the toroidal ring 44 against the side surface of the cylindrical seating 8, so as to obtain an hermetic closure of the said seating relative to the surface, turned inwardly, of diaphragm 43.

Successively there are created the calibration conditions, during which the outer surface of the diaphragm 43 is brought, at a pre-established temperature value, in presence of a fluid having a pressure equal to the minimum pressure value which the device 1 will normally have to detect and indicate during its operation. In these conditions, cap 30 and electric contact element 31 are pushed axially towards the seating 9 by the radial force transmitted from the diaphragm 43 to the head 38 of the cap and reach a position of equilibrium in which the force is compensated by the elastic reaction exerted by elements 21 and 24. Successively, an outer device, not shown, is activated, which forces the contact element 50 into the interior of the conical seating defined by the sleeve 49. The forcing action is interrupted at the instant in which between the head 27 of element 30 and the surface, turned towards it, of the element 50 there is established an electric continuity, detectable directly through the connection cables 55 and 57. In fact, cable 55 is in electric contact with element 50 through the connector 56, whilst cable 57 is electrically connected to element 31 through the body 2 and the elements 21 and 24. At the end of this operation the cavity 18 of the body 2 is completely filled with an insulating resin which, in addition to preventing axial movements of the element 50, with consequent variation of the calibration point, surrounds completely the contact 50 and the plate 58, thus preventing them from being damaged by atmospheric agencies.

The device 1 according to the present invention may be mounted on tires with or without air tubes. In both cases the assembly requires the provision of the hole 67 (FIG. 4) within which the device 1 is housed by means of connection element 68.

In the case of tire with an air tube, the latter will sucessively position itself so as to be in contact with the outer surface of the diaphragm 43.

In the case of a tubeless tire, the air under pressure will result in being in direct contact with both the said outer surface of diaphragm 43 and the surfaces, turned towards the diaphragm, of the sidewall 72 and annular rims 80 and 83 of element 68. The particular configuration of the inner annular projections 71 and the outer annular projections 74 ensures an effective seal between element 68 and device 1; in fact, because of the inflation pressure the annular projections 71, 74 are deflected, respectively, against the frusto-conical side surface of body 2 and against the inner surface of the hole 67, thereby preventing the air from flowing out towards the outside. Moreover, pressure increases give rise to increases of the intensity of the deflection and thus, improve the tightness of the seal.

The operation of the device according to the present invention will now be described first with reference to a working temperature close to the temperature of calibration, for example a temperature which is considerably higher.

In the first case, the inflation air of the tire produces, directly or through the air tube, an axial displacement, towards the seating 9, of the cap 30 and the element 31 whose head 27 is brought into contact with the facing surface of element 50, thus allowing the electric connection between the cable 55 and 57, as already described.

When the inflation pressure drops below the preestablished calibration limit, the said electric connection is opened and consequently, through cables 55 and 57, there is obtained an enabling of a signal circuit of known type and not shown.

An eventual increase of the temperature of the inflation air produces a respective increase of the pressure of the air and, consequently, a higher axial force acting onto the cap 30. Such temperature increase takes place also on element 21, thereby producing a corresponding flexion in an axial direction of the protuberances 22 and, consequently, a force having an intensity and a direction such as to counterbalance the pressure force onto the cap 30. Therefore, the activation of the signalling circuit takes place at any temperature of the tire to indicate always the same minimum value of inflation.

From the examination of the characteristics of the present invention it is clear that the device 1 represents an advantageous solution of the problems of the known devices.

In particular, the said device does not utilize any tight air chamber and therefore avoids the necessity of inflating such chamber with the described risks of lowering the limit of calibration.

Since the assembly requires the provision of a single radial and conical hole in the rim of the wheel, the device 1 can be utilized with tires of any type and with or without air tube. Moreover, since the total weight is considerably reduced (about 10 grams) and partly compensated by the removal of material from the rim 64 and the wall 65 for forming the hole 67, there is no necessity to carry out any further operation of equilibration of the wheel on which the device 1 is mounted.

Finally, it is clear that modifications and variations may be applied to the present innovation without departing from the scope of the inventive idea of the invention.

In particular, by varying the characteristics of the element 21 it is possible to obtain a detecting device of the type known as "hypercompensated", in which a gradual advance of the opening of the electric contact between the contact elements 50 and 31 at the increase of the temperature T. It is also possible to obtain that above a certain temperature the element 21 pushes the cap 30 and the contact 31 so as to detach the head 27 of the said contact 31 from the surface of the contact 50, even if the inflation pressure is per se sufficient but for other reasons the temperature of the tire has reached a excessively high value.

What we claim is:

1. A device for detecting when a critical value of inflation pressure within an inflated vehicle tire casing mounted on a rim has been overcome, said rim having an opening therethrough, said device comprising a cup-shaped body adapted to be disposed in the tire casing and to be connected to the said opening, said body having an aperture facing said tire casing and a bottom wall with a through hole, a flexible diaphragm connected to said cup-shaped body to close said aperture in an air-tight manner, said flexible diaphragm being adapted to take on two different shapes when the inflation pressure changes from one value to another value across the critical value, a first electric contact housed inside the through hole of the bottom wall of said cup-shaped body, a second electric contact, annular elastic means fastened peripherally to said cup-shaped body and supporting axially said second electric contact in an intermediate position between said first electric contact and said diaphragm to cause the second electric contact to be pushed continuously against said diaphragm so as to move together with it, said first and second electric contacts being contacted where said diaphragm has one of the said shapes but not when it has the other shape, and annular bimetallic means provided with a plurality of radial projections turned inwards, said bimetallic means being fastened peripherally to said body and housed between said body and said elastic means and being made of at least two metal materials having a different coefficient of thermal expansion, so that an increase of temperature of the air within the tire casing causes an increase of pressure thrust exerted on the surface of the diaphragm facing the tire casing, and a substantially identical increase of pressure thrust exerted on the opposite surface of the diaphragm from said bimetallic means through said second electric contact.

2. A device according to claim 1, wherein a sleeve is housed within the through hole of said cup-shaped body, said first electric contact element being force-fitted into said sleeve.

3. A device according to claim 1, wherein an annular element is housed within said cup-shaped body, said flexible diaphragm extending peripherally into a toroidal ring compressed in air tight manner between the peripheral surface of said annular element and an inner annular surface of lateral walls of said cup-shaped body facing the peripheral surface of said annular element.

4. A device according to claim 3, wherein said lateral walls of said cup-shaped body have a peripheral extension which is turned over and compresses said toroidal ring.

5. A device according to claim 1, wherein a cup-shaped element made of an elastically deformable material is arranged to receive said cup-shaped body and to be housed, in an air-tight manner, within said opening in said rim.

* * * * *